United States Patent
Drummond et al.

(10) Patent No.: US 10,685,307 B2
(45) Date of Patent: Jun. 16, 2020

(54) IMPLEMENTING AN END-OF-LIFE PURCHASE

(71) Applicant: INTERNATIONAL BUSINESS MACHINES CORPORATION, Armonk, NY (US)

(72) Inventors: John E. Drummond, Poughkeepsie, NY (US); Thomas J. Fleischman, Poughkeepsie, NY (US); Matthew W. Schoellmann, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 566 days.

(21) Appl. No.: 14/079,691

(22) Filed: Nov. 14, 2013

(65) Prior Publication Data

US 2014/0074543 A1    Mar. 13, 2014

Related U.S. Application Data

(63) Continuation of application No. 11/782,056, filed on Jul. 24, 2007, now Pat. No. 8,655,706.

(51) Int. Cl.
    *G06Q 10/06*     (2012.01)
    *G06Q 30/06*     (2012.01)
    *G06Q 30/02*     (2012.01)

(52) U.S. Cl.
    CPC ... *G06Q 10/06315* (2013.01); *G06Q 30/0202* (2013.01); *G06Q 30/06* (2013.01)

(58) Field of Classification Search
    CPC ............ G06Q 10/04; G06Q 10/06315; G06Q 30/0202; G06Q 30/06
    See application file for complete search history.

(56) References Cited

U.S. PATENT DOCUMENTS

| | | | |
|---|---|---|---|
| 5,232,242 A * | 8/1993 | Bachrach | B60G 17/0408 280/5.5 |
| 6,826,538 B1 * | 11/2004 | Kalyan | G06Q 10/06 705/400 |
| 6,978,249 B1 | 12/2005 | Beyer et al. | |
| 7,251,583 B2 | 7/2007 | Desai et al. | |
| 7,251,614 B1 * | 7/2007 | Li | G06Q 10/06 705/7.25 |
| 7,698,233 B1 * | 4/2010 | Edwards | G06Q 10/04 705/412 |
| 7,783,534 B2 | 8/2010 | Armstrong et al. | |

(Continued)

OTHER PUBLICATIONS

"Delaying end-of-life purchases", by Kyle D. Cattani et al., (hereinafter: Cattani), European Journal of Operational Research 146, 216-228; 2003.*

(Continued)

*Primary Examiner* — Pan G Choy
(74) *Attorney, Agent, or Firm* — Tihon Poltavets; Andrew M. Calderon; Roberts Calderon Safran & Cole, P.C.

(57) ABSTRACT

A system and method of implementing an end-of-life purchase of an item used in manufacturing. A method includes comparing a supply of an article to a demand for the article. The method also includes securing an amount of the article when the supply does not exceed the demand by a predetermined threshold, and waiting a predetermined period of time before repeating the comparing when the supply exceeds the demand by the predetermined threshold.

13 Claims, 5 Drawing Sheets

(56) References Cited

U.S. PATENT DOCUMENTS

| | | | |
|---|---|---|---|
| 2001/0047301 A1 | 11/2001 | Walker et al. | |
| 2002/0082994 A1* | 6/2002 | Herziger | G06Q 10/06 705/43 |
| 2002/0095322 A1* | 7/2002 | Zarefoss | G06Q 10/06 717/100 |
| 2002/0115341 A1* | 8/2002 | Hein | H01R 25/14 439/495 |
| 2002/0143665 A1 | 10/2002 | Santos et al. | |
| 2002/0169657 A1 | 11/2002 | Singh et al. | |
| 2003/0014287 A1* | 1/2003 | Williams | G06Q 10/0635 705/7.28 |
| 2003/0061076 A1 | 3/2003 | Okuyama et al. | |
| 2003/0069659 A1* | 4/2003 | Wada | G06Q 10/06 700/108 |
| 2003/0069739 A1* | 4/2003 | Wylie | G06Q 10/087 705/28 |
| 2003/0110051 A1* | 6/2003 | Altman | G06Q 30/02 705/26.1 |
| 2003/0144897 A1 | 7/2003 | Burruss et al. | |
| 2004/0064350 A1 | 4/2004 | Hanazato et al. | |
| 2004/0103048 A1* | 5/2004 | Vitulli | G06Q 10/087 705/28 |
| 2004/0177004 A1 | 9/2004 | Mueller et al. | |
| 2004/0249696 A1 | 12/2004 | Mathews et al. | |
| 2005/0187744 A1 | 8/2005 | Morrison et al. | |
| 2005/0209732 A1 | 9/2005 | Audimoolam et al. | |
| 2006/0047479 A1* | 3/2006 | Desai | G06Q 10/06 702/183 |
| 2006/0064344 A1 | 3/2006 | Lidow | |
| 2007/0239585 A1* | 10/2007 | Nielsen | G06Q 30/06 705/36 R |
| 2007/0299716 A1* | 12/2007 | Shorter | G06Q 10/04 705/7.22 |

OTHER PUBLICATIONS

"Product Life Cycle as Marketing Models", by William Cox, Jr., The Graduate School of Business of the University of Chicago, Oct. 1967.*

"Forecasting Supply and Demand with Reliable Facts and Figures", by Brian M. Nolan, Computer Applications in Power, IEEE vol. 8, Issue: 4, Oct. 1995.*

Cattani et al., "Good buy?, Delaying end-of-life purchases", by Kyle D. Cattani et al., (hereinafter: Cattani), European Journal of Operational Research 146, 216-228; 2003.*

"Good buy?, Delaying end-of-life purchases", by Kyle D. Cattani et al., European Journal of Operational Research 146, p. 216-228; 2003.*

"Good buy?, Delaying end-of-life purchases", by Kyle D. Cattani et al., (hereinafter: Cattani), European Journal of Operational Research 146, 216-228;2003.

"Forecasting and Scheduling for Past-Model Replacement Parts", by John Moore, Jr., Stanford University, ABI/INFORM Global, 1986.

"Determining Optimum Redesign Plans for Avionics Based on Electronic Part Obsolescence Forecast", by P. Singh et al., University of Maryland, College Park, MD, Society of Automotive Engineers, Inc., 2002.

"Modeling and Decision-Making in a Semiconductor Supply Chain", by Rama Chidambaram, Arizona State University, Aug. 2003.

"Managing Inventory with the Prospect of Obsolescence", by Jing-Sheng Song, University of California, Irvine, California, INFORMS, 1996.

"A Dynamic Programming Approach to Continuous Review Obsolescent Inventory Problem", by Israel David et al., Department of Industrial Engineering and Management, Ben-Gurion University of the Negev, May 26, 1997.

"Electronic Part Life Cycle Concepts and Obsolescence Forcasting", by Rajeev Solomon et al., IEEE Transaction on components and packaging Technologies, vol. 23, No. 4, Dec. 2000.

"Optimal Ordering Policies for Pershable Inventory", by Steven Nahmias, Operations Research, vol. 23, No. 4, Jul.-Aug. 1975.

"Study on a Combined Demand Forecasting Model of the Supply Chain", by Hui Hu et al., IEEE, 2006.

"Manufacturing Products with End-of-Life Considerations: An Economic Assesment to the Routes of Revenue Generation From Mature Products", by Ming Kaan Low et al., IEEE Transactions of Components, Packaging, and Manufacturing Technology—Part C, vol. 21, No. 1, Jan. 1998.

"Supporting Return Flows in the Supply Chain"; authors: Jos van Hillegersberg, Rob Zuidwijk, Jo van Nuden, Diana van Eijk; source: Communications of the AMC, vol. 44, Issue 6, pp. 74-79; Jun. 2001.

"Forecasting Supply and Demand with Reliable Facts and Figures"; author: Nolan, B.M.; source: Computer Applications in Power, IEEE, vol. 8, Issue 4, pp. 18-19; Oct. 1995.

"Risk Assesment Due to Local Demand Forecast Uncertainty in the Competitive Supply Industry"; authors: Lo, K.L; Wu, Y.K.; source: Generation, Transmission and Distribution, IEE Proceedings, vol. 150, Issue 5, pp. 573-582; Sep. 2003.

"Life Cycle Tools for Future Product Sustainability"; authors: Laura Armstrong Przekop, Shawn Kerr; source: IEEE International Symposium on Electronics and the Environment 2004 Conference Record, pp. 23-26; May 2004.

"How Product Characteristics Determine End-of-Life Strategies"; authors: Catherine M. Rose, Kosuke Ishii, Keijiro Masui; source: IEEE International Symposium on Electronics and the Environment 1998 Conference Record, pp. 322-327, May 1998.

"Study on Combined Demand Forecasting Model of the Supply Chain"; authors: Hui Hu, Guangyu Zhu, Yanjun Bo, Jinsheng Shen; source: 2006 International Conference on Service Systems and Service Management, vol. 1, pp. 251-255, Oct. 2006.

* cited by examiner

IMPLEMENTING AN END-OF-LIFE PURCHASE

FIELD OF THE INVENTION

The invention generally relates to manufacturing, and, more particularly, to implementing an end-of-life purchase of an article used in manufacturing.

BACKGROUND OF THE INVENTION

Manufacturers that provide products to customers routinely rely on suppliers or vendors for components (e.g., subassemblies, parts, ingredients, etc.) of the finished product. For example, the finished product may be manufactured by assembling various components that the manufacturer obtains from one or more suppliers. As such, the manufacturer's ability to produce the product is dependent upon any one supplier's ability to produce a particular component of the product. A problem arises, then, when a supplier of a component stops producing the component. In such situations, the manufacturer's ability to produce the product is hindered.

Quite often, a supplier of a component will inform the manufacturer that the supplier intends to stop providing a component before the supplier actually stops supplying the component. In such a situation, the manufacturer may attempt to forecast its future need of the component and make an end-of-life purchase (also called a last time buy) to meet the forecasted demand.

However, it is normally difficult to accurately forecast the projected need for any component. This is because a manufacturer can only predict the future demand for the product that utilizes the component, and that future demand may change due to any number of market forces. Moreover, even if the manufacturer can accurately predict the future demand, the manufacturer still is faced with making a one-time purchase of a potentially large amount of components. This can be problematic in that the manufacturer must expend a large amount of money to pay for the components up front, and must store and maintain an inventory of the component as it is used during future manufacturing of the product. Furthermore, there is the possibility that the forecasted need never materializes, and the manufacturer has purchased components that it no longer needs.

In order to provide some protection to demand changes and/or forecasting inaccuracies, a bank of components is sometimes created. For example, in the field of semiconductor fabrication, a supplier may agree to hold the component in die form in a die bank, and provide finished components via purchase orders from manufacturers until the die bank inventory is depleted.

However, this approach also presents problems for a manufacturer that utilizes the component in manufacturing a product. For example, plural manufacturers may have the ability to purchase the component from the finite amount of component available in the bank. As such, a particular manufacturer may be left without enough component if the other manufactures deplete the bank before the particular manufacturer can secure enough component from the bank.

Accordingly, there exists a need in the art to overcome the deficiencies and limitations described hereinabove.

SUMMARY OF THE INVENTION

In a first aspect of the invention, there is a method of securing a supply of an article, the method comprising comparing a supply of an article to a demand for the article. The method includes securing an amount of the article when the supply does not exceed the demand by a predetermined threshold, and waiting a predetermined period of time before repeating the comparing when the supply exceeds the demand by the predetermined threshold.

In another aspect of the invention, there is a method of securing supply of an article, the method comprising providing a computer infrastructure operable to: determine a ratio of a supply of an article to a demand for the article, and compare the ratio to a first threshold value. When the ratio does not exceed the first threshold value, an amount of the article is secured from the supply. When the ratio exceeds the first threshold value, the ratio is compared to a second threshold. When the ratio exceeds the second threshold value, a first amount of time is waited before repeating the determining. When the ratio does not exceed the second threshold value, a second amount of time is waited before repeating the determining.

In another aspect of the invention, there is a computer program product comprising a computer usable medium having a computer readable program embodied in the medium, wherein the computer readable program when executed on a computing device is operable to cause the computing device to: compare a supply of an article to a demand for the article; secure an amount of the article when the supply does not exceed the demand by a predetermined threshold; and wait a predetermined period of time before repeating the comparing when the supply exceeds the demand by the predetermined threshold.

DETAILED DESCRIPTION OF EMBODIMENTS OF THE INVENTION

The invention generally relates to manufacturing, and, more particularly, to implementing an end-of-life purchase (i.e., last time buy) of an article. In implementations of the invention, a feedback loop is provided in which a ratio of supply of an article to demand for the article is periodically compared to a threshold value. When the ratio exceeds the threshold value, a period of time is waited before checking the ratio again. When the ratio is less than the threshold value, a last time buy (LTB) is performed. In this manner, the exposure and vulnerability that result from the end-of-life of a component are reduced.

Figure 1:
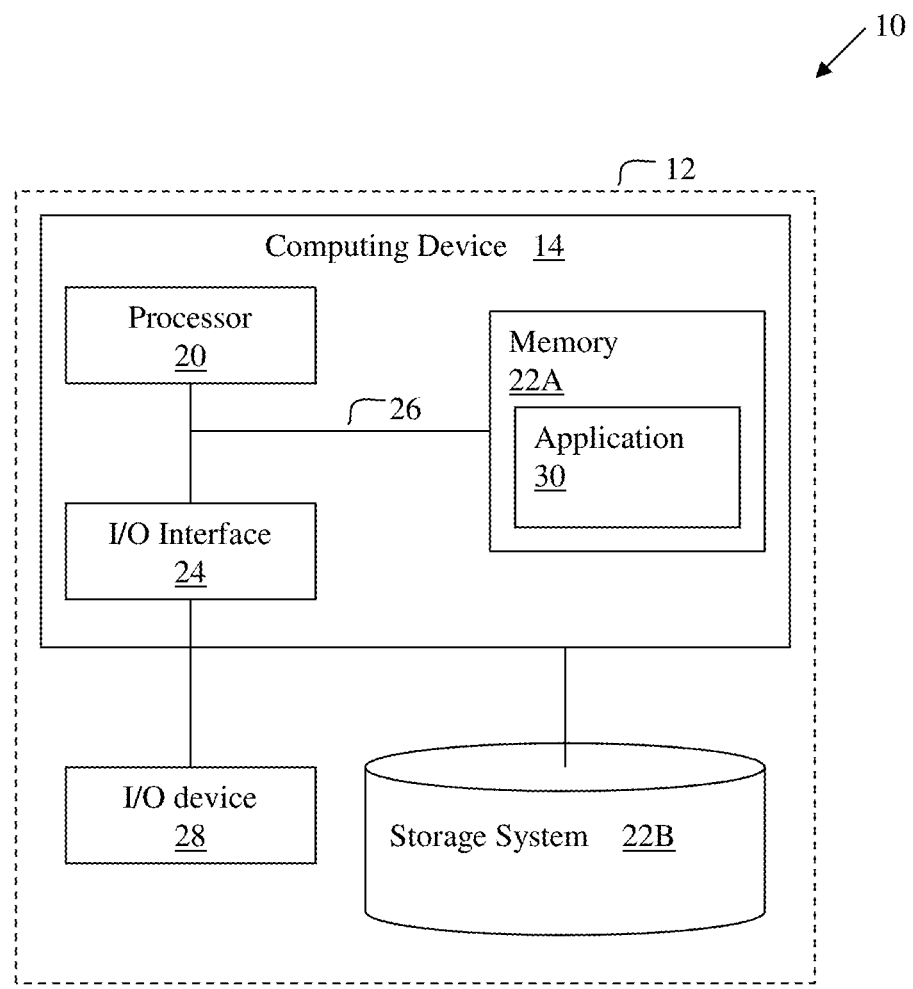
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes the computing device 14 operable to perform the processes described herein, for example, implementing an end-of-life purchase. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

The processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., desktop computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or providing entity, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
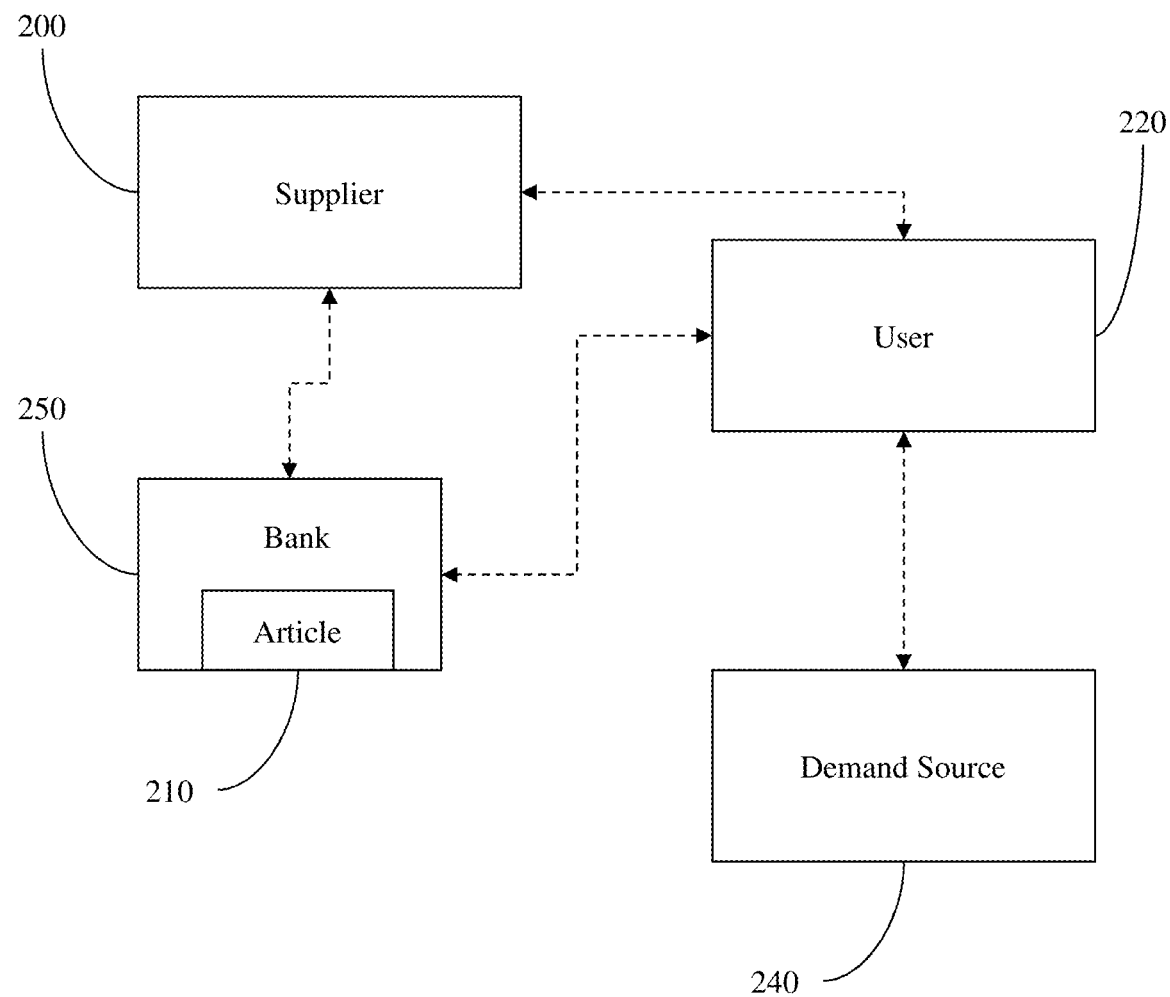
FIG. 2 shows an environment according to aspects of the invention.

FIG. 2 shows an environment according to aspects of the invention. The environment comprises a supplier 200 of an article 210 and a user 220 of the article 210. The article 210 may be any object provided by the supplier 200 to the user 220, such as, for example, an automobile part, a semiconductor component, a food ingredient, etc. The supplier 200 may be any entity that provides the article 210 to the user 220, such as, for example, a fabricator, vendor, etc. The user 220 may be any entity that receives and uses the article 210, such as, for example, an automobile manufacture, a semiconductor device manufacturer, etc. Although specific examples of the supplier 200, article 210, and user 220 are provided herein, the invention is not limited to these specific examples, and the invention may be implemented with any suitable supplier, article, and user.

Also shown in FIG. 2 is a demand source 240 associated with the user 220. The demand source 240 calls for use of the article 210 by the user 220. For example, the article 210 may comprise a semiconductor component that the user 220 incorporates into a product that the user 220 sells to the consuming public. In such a case, the consuming public would constitute the demand source 240.

As another example, the user 220 may be an assembler of a computing device, such as that described with respect to FIG. 1, and the demand source 240 may be a contract manufacturer (e.g., subcontractor) that fabricates a portion of the computing device using the article 210. In such as case, the contract manufacturer (e.g., subcontractor) constitutes the demand source 240.

As an even further example, the user 220 may consume the article 210 in order to produce a product. For example, the article 210 may be lubricating oil that is used in the user's 220 brake caliper stamping machine, whereby the user 220 sells stamped brake calipers to an automobile manufacturer. In such a case, the user 220 internally comprises the demand source 240.

The invention is not limited to the exemplary demand sources described above. Moreover, the invention is not limited to a single demand source, but, rather, any suitable number of demand sources may be realized. Furthermore, if plural demand sources are present, they need not demand the same amount of the article 210 from the user 220. For example, the user 220 may use the article 210 in a product that the user 220 sells to plural different authorized dealers, where one dealer requests more of the product (and, hence more of the article 210) than another dealer. Even further, the demand from any given demand source 240 may be variable over time.

Still referring to FIG. 2, a bank 250 is shown. In embodiments, the bank 250 comprises at least one article 210. For example, the supplier 200 may implement a die bank where semiconductor die are held until the user requests completed semiconductor components. The user 220 has access to articles 210 in the bank 250, such as, for example, via purchase order to the supplier 200. In this way, the user 220 may utilize articles 210 from the bank 250 to meet the demand of the demand source 240. Typically, the bank 250 has a finite number of articles 210, such that when the bank 250 is depleted the user 220 cannot obtain any more articles 210.

In embodiments of the invention, the user 220 uses processes of the invention to manage when to execute a last time buy (LTB) of articles 210 from the bank 250. For example, the user 220 may comprise a computing device (such as, for example, that described with respect to FIG. 1) that includes hardware and/or software that is arranged to perform some or all of the processes described herein. By using implementations of the invention, the user 220 may reduce the risk and uncertainty associated with executing a last time buy (LTB) of an amount of articles 210.

Processes of the Invention

The steps of the flow diagrams described herein may be implemented in the environment of FIG. 1, as well as in the environment of FIG. 2. The flow diagrams may equally represent a high-level block diagram of the invention. The steps of the flow diagrams may be implemented and executed from a server, in a client-server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 3:
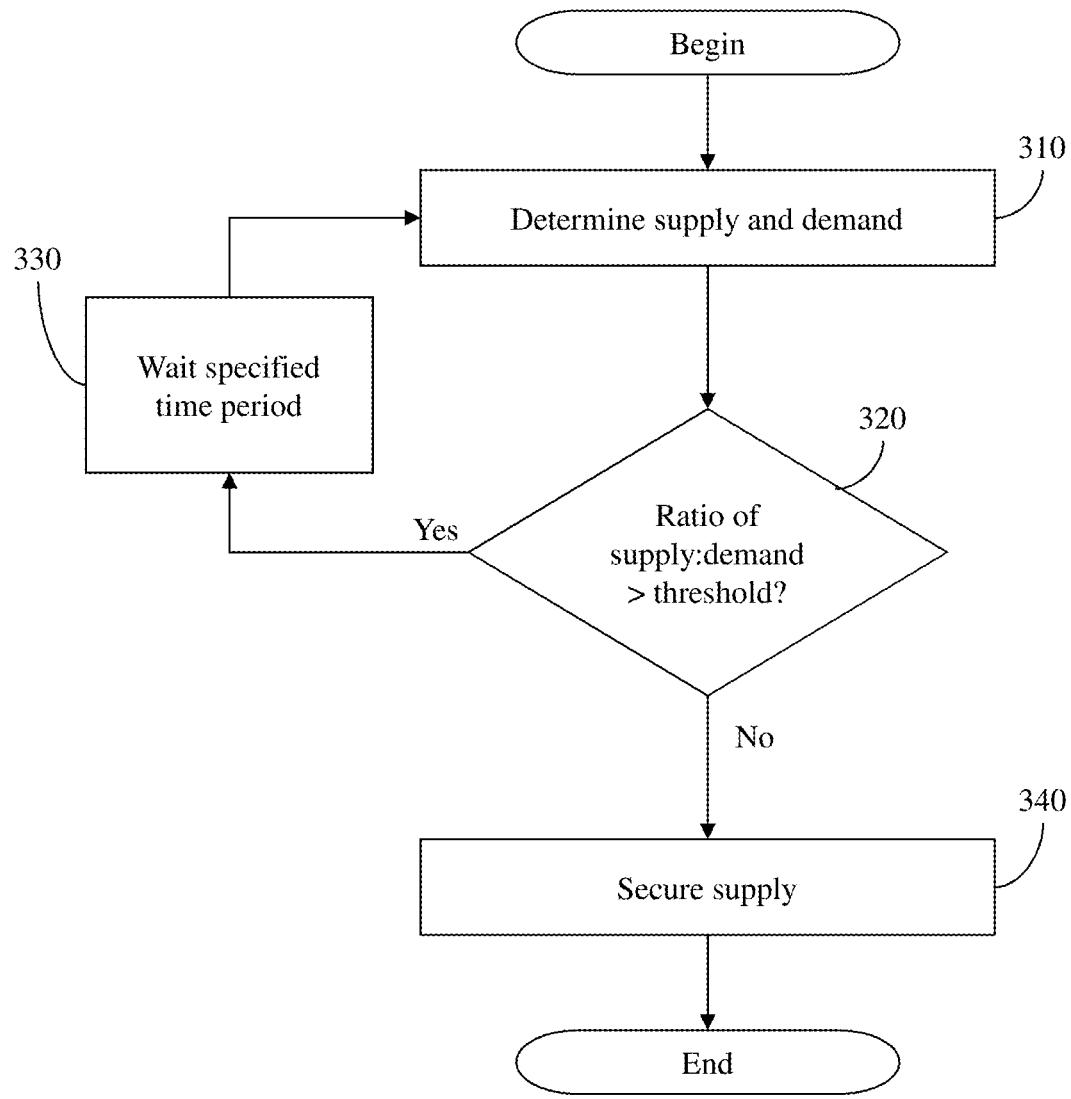
FIGS. 3-5 show flow diagrams depicting implementations of methods according to aspects of the invention.

FIG. 3 shows a flow diagram depicting steps of a first method for implementing an end of life purchase (e.g., last time buy) according to aspects of the invention. At step 310, a user of an article determines an available supply of an article. The user and article may be similar to those described above with respect to FIG. 2. In embodiments, the user determines the supply by determining the amount of articles available from a bank, such as, for example, a bank described above with respect to FIG. 2. This may be done, for example, by querying a supplier or inventory manager of the bank, and receiving a communication regarding the amount of supply of the article in the bank.

Step 310 also includes determining demand for the article. In embodiments, the demand is determined by the user by examining any appropriate demand sources, such as, for example, demand sources described above with respect to FIG. 2. For example, the user may: predict future sales to the public, ask contracting manufacturers how many units of the articles they need, etc. In implementations, when more than one demand source is present, the user sums all of the individual demand sources to arrive at a total demand for the article.

In embodiments, the determining of the supply and/or the determining of the demand at step 310 may be performed automatically by computing device, such as, for example, a computing device as shown in FIG. 1. For example, a computing device of the user may be arranged to automatically (e.g., via software program and electronic communication) query a computing device of the bank to determine the amount of supply in the bank. Similarly, a computing device of the user may be arranged to automatically query a computing device of a contract manufacturer to determine the amount of demand required by that contract manufacturer. Similarly, a computing device of the user may be arranged to predict future sales that involve the article. Additionally or alternatively, the supply and/or demand may be determined manually.

At step 320, the supply is compared to the demand. In embodiments, a ratio of the supply to the demand is compared to a predetermined threshold value. The threshold value may be any appropriate value, such as, for example, two. That is, when the ratio of supply to demand exceeds the threshold value (e.g., two), the process proceeds to step 330. When the ratio of supply to demand is less than or equal to the threshold value, the process proceeds to step 340. Although a threshold value of two is described, any threshold value may be used with the invention.

At step 330, the user waits for a predetermined time period before returning to step 310 to determine supply and demand again. By determining that the ratio of supply to demand exceeds the threshold, the user has determined that there is enough of the article in the bank inventory to supply the user's near-future needs. Therefore, it is not necessary at step 330 to make a last time buy of the article. In embodiments, the time period is one year; however, the invention is not limited to a one year time period, and any suitable time period may be used. In further embodiments, the time period is maintained as a data field in a database operated by the user, the data field being associated with a part number or serial number of the article. Additionally or alternatively, the threshold value may be maintained as a data field in the same parts database or in another software program.

At step 340, the user secures the supply of articles that are needed to meet the forecast demand. In embodiments, this constitutes executing a last time buy of the article. Because the ratio of supply to demand is less than the threshold, the user is in danger of not having enough of the article to meet forecast demand. Therefore, the user needs to secure enough of the article to meet the demand. In embodiments, this may be performed by sending a purchase order (e.g., via computer, manually, etc.) to the supplier, although other methods of executing the last time buy may be used with the invention.

By using the process described in FIG. 3, including the periodic comparison of the supplier inventory versus the user requirements at steps 310, 320 and 330, the user is able to postpone the execution of the last time buy at step 340. This minimizes supply line exposure for the supplier and the user, and also minimizes financial obligations for both the supplier and the user.

Figure 4:
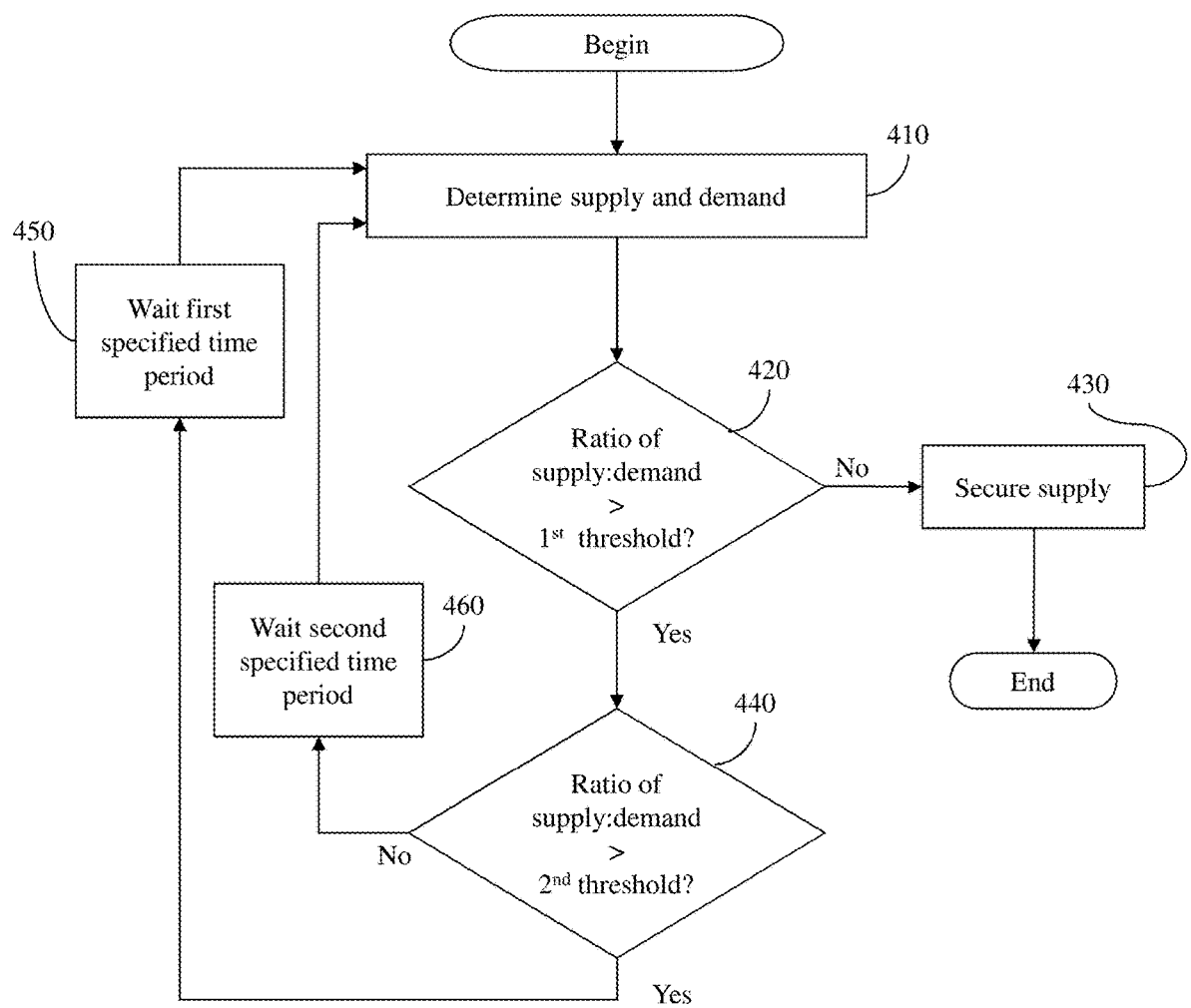

FIG. 4 shows a flow diagram depicting steps of another process according to aspects of the invention. At step 410, the supply and demand of the article are determined. This may be performed similar to step 310. At step 420, the supply is compared to the demand. This may be performed similar to step 320, for example, by comparing the ratio of supply to demand to a first threshold. The first threshold may be any suitable value, such as, for example, two.

When the ratio of supply to demand is less than or equal to the first threshold, the process proceeds to step 430 where the supply is secured (e.g., by executing a last time buy). This may performed similar to step 340.

When the ratio of supply to demand exceeds the first threshold, the process proceeds to step 440, where the ratio of supply to demand is compared to a second threshold. In embodiments, the second threshold has a value greater than the first threshold. For example, the first threshold may have a value of two, and the second threshold may have a value of three. Comparison of the ratio of supply to demand to the second threshold provides an indication of when the first threshold is being approached.

When the ratio of supply to demand exceeds the second threshold, the process proceeds to step 450 where a first time period is waited before returning to step 410. In embodiments, the first time period is one year, and is entered as a data field in a parts database at step 450. When the first time period has elapsed, the database triggers (e.g., by notification to a human operator, or automatically via software programming) the execution of step 410.

At step 440, when the ratio of supply to demand does not exceed the second threshold, then the process proceeds to step 460 in which a second time period is waited before returning to step 410. In embodiments, the second time period is less than the first time period. For example the second time period may be three months, and may be maintained as a data field in a parts database at step 460. When the second time period has elapsed, the database triggers (e.g., by notification to a human operator, or automatically via software programming) the execution of step 410.

In this manner, the process of FIG. 4 provides for increasing the frequency of periodically checking the supplier inventory when the ratio of supply to demand approaches the last time buy threshold. Although specific examples for the first threshold, second threshold, first time period, and second time period have been provided, the invention is not limited to these specific examples, and any suitable values may be used. Moreover, while the invention has been described with respect to comparing a ratio of supply to demand to a threshold value, it is noted that any suitable mathematical formula or logical expression may be used to determined whether to execute a last time buy or continue periodically checking the inventory. Furthermore, by maintaining the first threshold, second threshold, first time period, and second time period in a database, these values may be reviewed and altered at any time.

Figure 5:
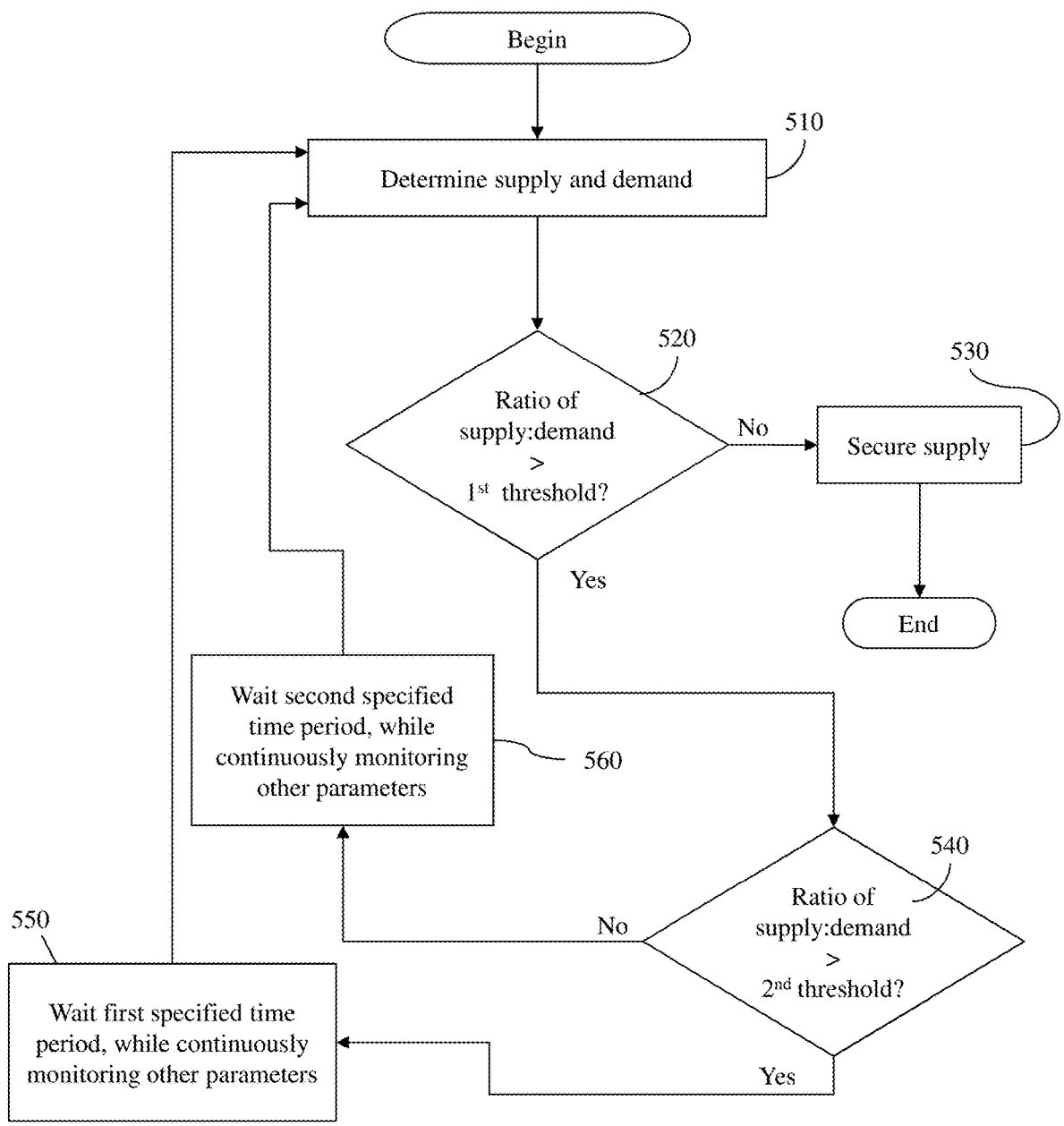

FIG. 5 shows a flow diagram depicting steps of another process according to aspects of the invention. At step 510, the supply and demand of the article are determined. At step 520, the supply is compared to the demand. When the ratio of supply to demand is less than or equal to the first threshold, the process proceeds to step 530 where the supply is secured (e.g., by executing a last time buy). When the ratio of supply to demand exceeds the first threshold, the process proceeds to step 540, where the ratio of supply to demand is compared to a second threshold. Steps 510, 520, 530, and 540 may be performed in a manner similar to steps 410, 420, 430, and 440.

When the ratio of supply to demand exceeds the second threshold, the process proceeds to step 550 where a first time period is waited before returning to step 510. In embodiments, the first time period is one year, and is entered as a data field in a parts database at step 550. When the first time period has elapsed, the database triggers (e.g., by notification to a human operator, or automatically via software programming) the execution of step 510.

At step 540, when the ratio of supply to demand does not exceed the second threshold, then the process proceeds to step 560 in which a second time period is waited before returning to step 510. In embodiments, the second time period is less than the first time period. For example the second time period may be three months, and may be maintained as a data field in a parts database at step 560. When the second time period has elapsed, the database triggers (e.g., by notification to a human operator, or automatically via software programming) the execution of step 510.

While awaiting the first or second time period at step 550 or 560, a substantially constant monitoring of other parameters may be performed to trigger proceeding immediately to step 510 without any further wait. For example, the current date may be compared to a cut off date. In embodiments, the cut off date is set as a date at which it is necessary (e.g., for marketing reasons) to compare the supply inventory to demand. The cut off date may be designated and stored in the same parts database as the time periods and thresholds. When the current date equals the cut off date, the process proceeds immediately to step 510, regardless of the remainder of the first or second time period. When the current date does not equal the cut off date, the waiting and monitoring of other parameters at step 550 (or 560) continues.

Additionally or alternatively to a cut off date, another parameter that may be substantially continuously monitored at steps 550 and 560 is a demand forecast change. For example, if a demand source, with or without querying from the user, signifies an increase in demand that exceeds a predefined amount of increase, then the process proceeds immediately to step 510, regardless of the remainder of the first or second time period. When the demand forecast does not change by an amount exceeding the predefined amount of increase, then the process proceeds continues to wait the appropriate time period at either step 550 or 560.

While cut off date and demand forecast change have been described as the other parameters for continuous monitoring at steps 550 and 560, the invention is not limited to these exemplary embodiments, and any suitable other parameters may be used with the invention. For example, another parameter that may be substantially continuously monitored is pull rate. Moreover, more than one other parameter may be continuously monitored at steps 550 and 560.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with modifications and in the spirit and scope of the appended claims.

What is claimed is:

1. A method of manufacturing an integrated circuit chip comprising:

securing, using a computer device-implemented method, a supply of an article comprising a physical component for manufacturing the integrated circuit chip, the computer device-implemented method of securing the supply of the article comprising:

determining a supply of the article in a bank, separate from the user, where the article is stored, and determining a demand of the article;

comparing a ratio of the supply to the demand to a first threshold value associated with an end-of-life purchase of the article;

determining the ratio exceeds the first threshold value;

based on the determining the ratio exceeds the first threshold value, comparing the ratio to a second threshold value;

when the ratio exceeds the second threshold value, waiting a first predetermined time period and then notifying a user to prompt the user to repeat the determining the supply and the demand;

when the ratio exceeds the first threshold level but does not exceed the second threshold value, waiting a second predetermined time period and then notifying the user to prompt the user to repeat the determining the supply and the demand;

determining the ratio is equal to or less than the first threshold value, and, when the ratio is less than or equal to the first threshold value, executing the end-of-life purchase of the article to secure a supply of the article from the supplier to the user, and constantly monitoring a rate of increase in demand for the article and repeating the determining step of supply and demand before either the first predetermined time period or the second predetermined time period have elapsed if the rate of increase in demand exceeds a predetermined amount; and manufacturing the integrated circuit chip by integrating, via the user, the article with chips, discrete circuit elements or signal processing devices, after executing the end-of-life purchase of the article, wherein the first threshold value is less than the second threshold value, the first predetermined time period is greater than the second predetermined time period, the determining the supply and the demand comprises querying an inventory of the bank where the article is located, and summing demand from plural demand sources using a computer device, and the computer device comprises a parts database.

2. The method of claim 1, wherein:
the first threshold value, the second threshold value, the first time period, and the second time period are maintained as data fields in the parts database; and
the data fields are associated with a part number or a serial number of the article.

3. The method of claim 1, wherein the comparing the ratio to the second threshold value when the ratio exceeds the first threshold value provides an indication of when the first threshold value is being approached.

4. The method of claim 1, further comprising constantly monitoring a predetermined parameter and repeating the determining step of supply and demand before either the first predetermined time period or the second predetermined time period have elapsed when a predetermined condition regarding the predetermined parameter is determined to exist.

5. The method of claim 4, wherein the predetermined parameter is a current date and the predetermined condition is a cut off date.

6. The method of claim 1, wherein the component comprises a chip in raw wafer form.

7. The method of claim 6, wherein the integrated circuit chip comprises a multichip package.

8. The method of claim 1, wherein the bank comprises a semiconductor die bank and the article comprises semiconductor dies stored in the semiconductor die bank.

9. The method of claim 8, wherein determining the supply of the article is performed by querying an inventory manager of the bank.

10. The method of claim 8, wherein the integrating comprises manufacturing an integrated circuit chip.

11. The method of claim 5, wherein the cutoff date is stored in the parts database.

12. The method of claim 11, wherein, when the current date equals the cut off date, a determination is made of the supply of the article and the demand of the article regardless of time remaining in the first and second predetermined time periods.

13. The method of claim 1, wherein the user comprises an assembler of the computer device.

* * * * *